(12) United States Patent
Morgan et al.

(10) Patent No.: US 7,206,747 B1
(45) Date of Patent: Apr. 17, 2007

(54) SPEECH COMMAND INPUT RECOGNITION SYSTEM FOR INTERACTIVE COMPUTER DISPLAY WITH MEANS FOR CONCURRENT AND MODELESS DISTINGUISHING BETWEEN SPEECH COMMANDS AND SPEECH QUERIES FOR LOCATING COMMANDS

(75) Inventors: Scott Anthony Morgan, Austin, TX (US); David John Roberts, Stockton (GB); Craig Ardner Swearingen, Austin, TX (US); Alan Richard Tannenbaum, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 842 days.

(21) Appl. No.: 09/213,858

(22) Filed: Dec. 16, 1998

(51) Int. Cl.
*G01L 21/00* (2006.01)
*G01L 15/04* (2006.01)

(52) U.S. Cl. ..................... 704/275; 704/251
(58) Field of Classification Search ................ 704/235, 704/251, 270, 275
See application file for complete search history.

(56) References Cited

U.S. PATENT DOCUMENTS

| | | | |
|---|---|---|---|
| 4,726,065 A | 2/1988 | Foressl | 381/41 |
| 4,766,529 A | 8/1988 | Nakano et al. | 364/513.5 |
| 4,866,778 A * | 9/1989 | Baker | 704/254 |
| 5,027,406 A | 6/1991 | Roberts et al. | 381/43 |
| 5,068,900 A | 11/1991 | Searcy et al. | 381/43 |
| 5,133,011 A | 7/1992 | McKiel, Jr. | 381/43 |
| 5,157,384 A | 10/1992 | Greanias et al. | 340/706 |
| 5,222,146 A | 6/1993 | Bahl et al. | 381/41 |
| 5,231,670 A * | 7/1993 | Goldhor et al. | 704/275 |
| 5,305,244 A | 4/1994 | Newman et al. | 364/708.1 |
| 5,386,494 A | 1/1995 | White | 395/2.84 |
| 5,408,582 A | 4/1995 | Colier | 395/2.52 |
| 5,428,707 A | 6/1995 | Gould et al. | 395/2.4 |
| 5,465,317 A | 11/1995 | Epstein | 395/2.45 |
| 5,500,920 A | 3/1996 | Kupiec | 395/2.79 |
| 5,526,407 A | 6/1996 | Russell et al. | 379/89 |
| 5,553,121 A | 9/1996 | Martin et al. | 379/88 |
| 5,602,963 A | 2/1997 | Bissonnette et al. | 395/2.84 |
| 5,604,840 A | 2/1997 | Asai et al. | 395/11 |
| 5,632,002 A | 5/1997 | Hashimoto et al. | 395/2.4 |
| 5,638,486 A | 6/1997 | Wang et al. | 395/2.45 |
| 5,664,061 A | 9/1997 | Andreshak et al. | 704/275 |
| 5,671,328 A | 9/1997 | Fitzpatrick et al. | 395/2.55 |
| 5,698,834 A | 12/1997 | Worthington et al. | 235/472 |

(Continued)

*Primary Examiner*—Angela Armstrong
(74) *Attorney, Agent, or Firm*—Jerry B. Kraft; Mark S. Walker (57) ABSTRACT

A speech recognition system which does not switch modes of operation when interpreting speech queries, such as help queries, or receiving actual spoken commands. The system handles both concurrently and seamlessly in the same operation mode. The present invention is directed to an interactive computer controlled display system with speech recognition comprising an implementation for predetermining a plurality of speech commands each associated with a corresponding plurality of system actions in combination with an implementation for concurrently detecting speech commands and speech queries for locating commands. There is also provided an implementation responsive to a detected speech command for carrying out the system action corresponding to the command, and an implementation responsive to a detected speech query for attempting to locate commands applicable to said query. The system also includes an implementation for displaying the detected speech query together with an implementation for displaying located commands applicable to said query.

15 Claims, 10 Drawing Sheets

U.S. PATENT DOCUMENTS

| | | | |
|---|---|---|---|
| 5,706,399 A | 1/1998 | Bareis | 395/2.83 |
| 5,729,659 A | 3/1998 | Potter | 395/2.79 |
| 5,748,841 A * | 5/1998 | Morin et al. | 704/257 |
| 5,864,815 A * | 1/1999 | Rozak et al. | 704/275 |
| 5,890,122 A * | 3/1999 | Van Kleeck et al. | 704/275 |
| 6,088,671 A * | 7/2000 | Gould et al. | 704/235 |

* cited by examiner

SPEECH COMMAND INPUT RECOGNITION SYSTEM FOR INTERACTIVE COMPUTER DISPLAY WITH MEANS FOR CONCURRENT AND MODELESS DISTINGUISHING BETWEEN SPEECH COMMANDS AND SPEECH QUERIES FOR LOCATING COMMANDS

CROSS-REFERENCE TO RELATED COPENDING PATENT APPLICATIONS

The following patent applications, which are assigned to the assignee of the present invention and filed concurrently herewith, cover subject matter related to the subject matter of the present invention: "SPEECH COMMAND INPUT RECOGNITION SYSTEM FOR INTERACTIVE COMPUTER DISPLAY WITH INTERPRETATION OF ANCILLARY RELEVANT SPEECH QUERY TERMS INTO COMMANDS", Scott A. Morgan et al., Ser. No. 09/213,856; "SPEECH COMMAND INPUT RECOGNITION SYSTEM FOR INTERACTIVE COMPUTER DISPLAY WITH TERM WEIGHTING MEANS USED IN INTERPRETING POTENTIAL COMMANDS FROM RELEVANT SPEECH TERMS", Scott A. Morgan et al., Ser. No. 09/213,845; "SPEECH COMMAND INPUT RECOGNITION SYSTEM FOR INTERACTIVE COMPUTER DISPLAY WITH SPEECH CONTROLLED DISPLAY OF RECOGNIZED COMMANDS", Scott A. Morgan, Ser. No. 09/845,846.

"METHOD AND APPARATUS FOR PRESENTING PROXIMAL FEEDBACK IN VOICE COMMAND SYSTEMS". Alan R. Tannenbaum, Ser. No. 213,857, assigned to the same assignee as the present invention and filed on Dec. 16, 1998.

TECHNICAL FIELD

The present invention relates to interactive computer controlled display systems with speech command input and more particularly to such systems which present display feedback to the interactive users.

BACKGROUND OF RELATED ART

The 1990's decade has been marked by a technological revolution driven by the convergence of the data processing industry with the consumer electronics industry. This advance has been even further accelerated by the extensive consumer and business involvement in the Internet over the past few years. As a result of these changes it seems as if virtually all aspects of human endeavor in the industrialized world requires human/computer interfaces. There is a need to make computer directed activities accessible to people who, up to a few years ago, were computer illiterate or, at best, computer indifferent.

Thus, there is continuing demand for interfaces to computers and networks which improve the ease of use for the interactive user to access functions and data from the computer. With desktop-like interfaces including windows and icons, as well as three-dimensional virtual reality simulating interfaces, the computer industry has been working hard to fulfill such user interaction needs by making interfaces more user friendly by making the human/computer interfaces closer and closer to real world interfaces, e.g. human/human interfaces. In such an environment it would be expected that speaking to the computer in natural language would be a very natural way of interfacing with the computer for even novice users. Despite the potential advantages of speech recognition computer interfaces, this technology has been relatively slow in gaining extensive user acceptance.

Speech recognition technology has been available for over twenty years but it only recently has begun to find commercial acceptance, particularly with speech dictation or "speech to text" systems such as those marketed by International Business Machines Corporation (IBM) and Dragon Systems. This aspect of the technology is now expected to have accelerated development until it will have a substantial niche in the word processing market. On the other hand, a more universal application of speech recognition input to computers, which is still behind expectations in user acceptance, is in command and control technology wherein, for example, a user may navigate through a computer system's graphical user interface (GUI) by the user speaking the commands which are customarily found in the systems' menu text, icons, labels, buttons, etc.

Many of the deficiencies in speech recognition both in word processing and in command technologies are due to inherent voice recognition errors due in part to the status of the technology and in part to the variability of user speech patterns and the user's ability to remember the specific commands necessary to initiate actions. As a result, most current voice recognition systems provide some form of visual feedback which permits the user to confirm that the computer understands his speech utterances. In word processing, such visual feedback is inherent in this process since the purpose of the process is to translate from the spoken to the visual. That may be one of the reasons that the word processing applications of speech recognition have progressed at a faster pace.

However, in speech recognition driven command and control systems, the constant need for switching back and forth from a natural speech input mode of operation, when the user is requesting help or making other queries, to command mode of operation, when the user is issuing actual commands, tends to be very tiresome and impacts user productivity, particularly when there is an intermediate display feedback. This limitation in speech recognition systems is unfortunate because help functions has been one area where speech recognition technology has the opportunity to be much more user friendly than conventional keyboard and mouse input systems in giving the user rapid and heuristic feedback to hone in on the right commands to perform the desired functions.

SUMMARY OF THE PRESENT INVENTION

The present invention affords a solution to the above limitations by providing a speech recognition system which does not switch modes of operation when interpreting speech queries, such as help queries or receiving actual spoken commands. The system handles both concurrently and seamlessly in the same operation mode. The present invention is directed to an interactive computer controlled display system with speech recognition comprising means for predetermining a plurality of speech commands each associated with a corresponding plurality of system actions in combination with means for concurrently detecting speech commands and speech queries for locating commands. There is also provided means responsive to a detected speech command for carrying out the system action corresponding to the command and means responsive to a detected speech query for attempting to locate commands applicable to said query.

The system also includes means for displaying the detected speech query together with means for displaying located commands applicable to said query. The system may further include means responsive to a detected speech query for modifying a displayed prior speech query. Accordingly, a user has the option of speaking a displayed located command to activate said means for carrying out a system action, i.e. executing the command. Alternatively, the user may speak a query that modifies the prior query to thereby try to locate commands other than the displayed commands without switching between command and query modes of speech detection.

According to a further aspect of the invention, means are provided for modifying said prior speech query to replace said prior query with a new speech query.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
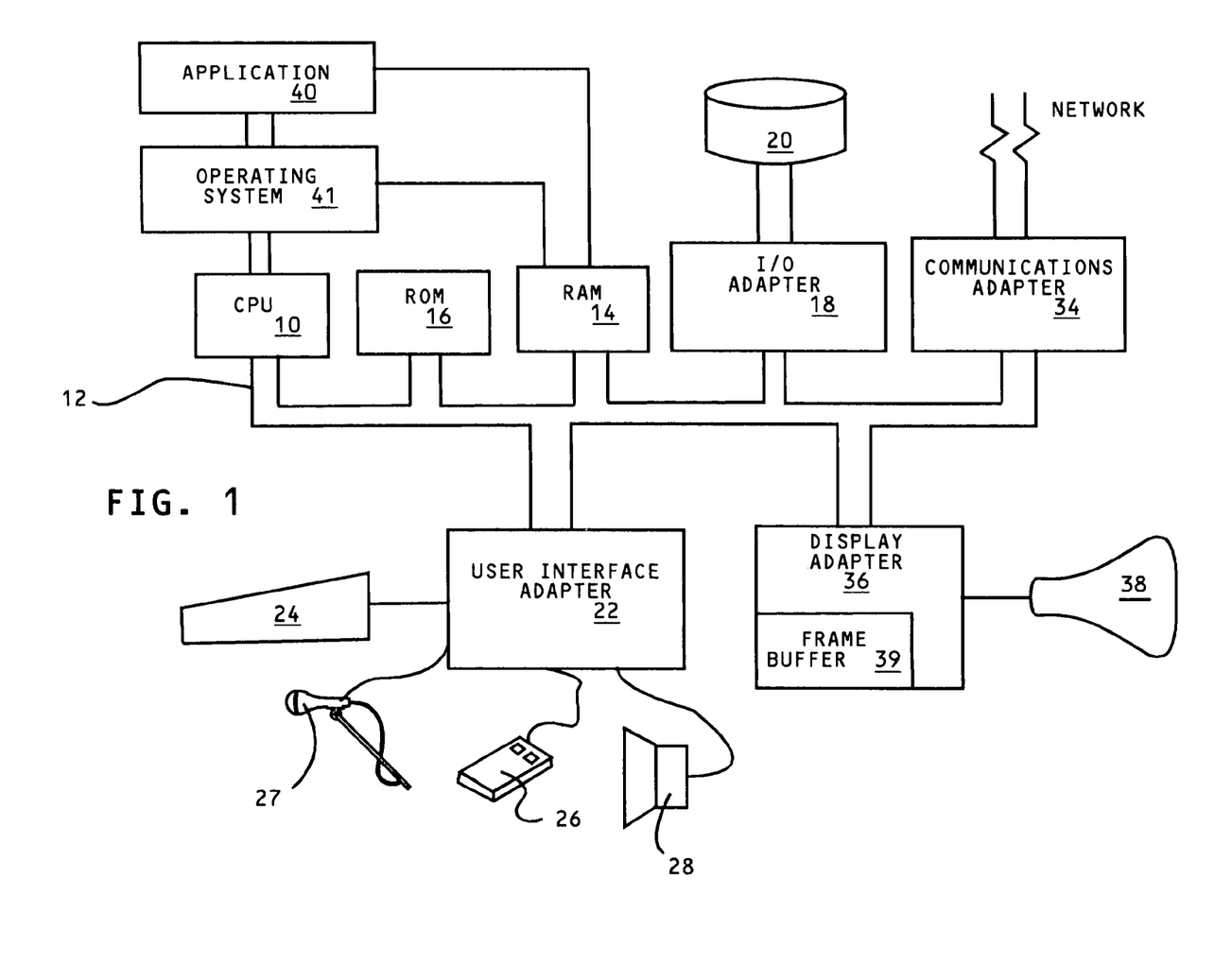
FIG. 1 is a block diagram of a generalized data processing system including a central processing unit which provides the computer controlled interactive display system with voice input used in practicing the present invention.

Referring to FIG. 1, a typical data processing system is shown which may function as the computer controlled display terminal used in implementing the system of the present invention by receiving and interpreting speech input modelessly into concurrently displayed and operational speech commands ready for execution, and speech query searching for locating other commands. A central processing unit (CPU) 10, such as any PC microprocessor in a PC available from IBM or Dell Corp. is provided and interconnected to various other components by system bus 12. An operating system 41 runs on CPU 10, provides control and is used to coordinate the function of the various components of FIG. 1. Operating system 41 may be one of the commercially available operating systems such as the OS/2™ operating system available from IBM (OS/2 is a trademark of International Business Machines Corporation); Microsoft's Windows 95™ or Windows NT™, as well as UNIX or AIX operating systems. A speech recognition program for interpreting speech input modelessly into concurrently displayed and operational speech command implementation and speech query searching and locating, application 40, to be subsequently described in detail, runs in conjunction with operating system 41 and provides output calls to the operating system 41 which implement the various functions to be performed by the application 40. A read only memory (ROM) 16 is connected to CPU 10 via bus 12 and includes the basic input/output system (BIOS) that controls the basic computer functions. Random access memory (RAM) 14, I/O adapter 18 and communications adapter 34 are also interconnected to system bus 12. It should be noted that software components, including operating system 41 and application 40, are loaded into RAM 14, which is the computer system's main memory. I/O adapter 18 may be a small computer system interface (SCSI) adapter that communicates with the disk storage device 20, i.e. a hard drive. Communications adapter 34 interconnects bus 12 with an outside network enabling the data processing system to communicate with other such systems over a local area network (LAN) or wide area network (WAN), which includes, of course, the Internet. I/O devices are also connected to system bus 12 via user interface adapter 22 and display adapter 36. Keyboard 24 and mouse 26 are all interconnected to bus 12 through user interface adapter 22. Audio output is provided by speaker 28, and the speech input, which is made through input device 27, which is diagrammatically depicted as a microphone which accesses the system through an appropriate interface adapter 22. The speech input and recognition will subsequently be described in greater detail, particularly with respect to FIG. 2. Display adapter 36 includes a frame buffer 39, which is a storage device that holds a representation of each pixel on the display screen 38. Images such as speech input command, relevant proposed commands, as well as speech input display feedback panels may be stored in frame buffer 39 for display on monitor 38 through various components such as a digital to analog converter (not shown) and the like. By using the aforementioned I/O devices, a user is capable of inputting visual information to the system through the keyboard 24 or mouse 26 in addition to speech input through microphone 27, and receiving output information from the system via display 38 or speaker 28.

Figure 2:
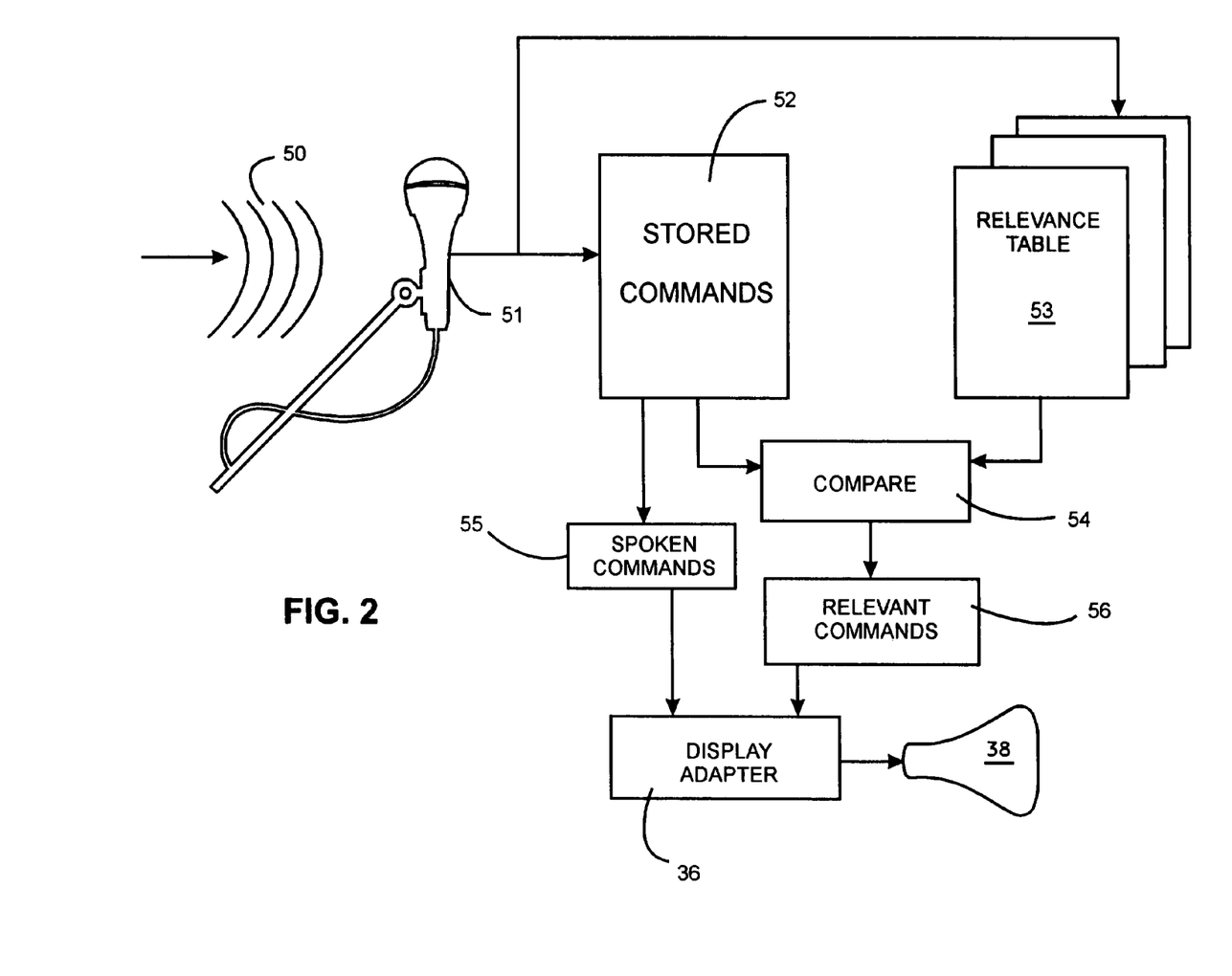
FIG. 2 is a block diagram of a portion of the system of FIG. 1 showing a generalized expanded view of the system components involved in the implementation.

Now with respect to FIG. 2, there will be described a system for carrying out recognized speech queries so as to locate commands appropriate to the terms of the query. The system is covered in the above described cross-referenced application: "SPEECH COMMAND INPUT RECOGNITION SYSTEM FOR INTERACTIVE COMPUTER DISPLAY WITH INTERPRETATION OF ANCILLARY RELEVANT SPEECH QUERY TERMS INTO COMMANDS", Scott A. Morgan et al. It should be noted that while this referenced application is the preferred method of locating commands applicable to the speech query, this invention is operable with any other process for searching for commands in response to spoken queries such as "Help" queries. With respect to the general system components of FIG. 2, voice or speech input 50 is applied through microphone 51 which represents a speech input device. Since the art of speech terminology and speech command recognition is an old and well developed one, we will not go into the hardware and system details of a typical system which may be used to implement the present invention. It should be clear to those skilled in the art that the systems and hardware in any of the following patents may be used: U.S. Pat. No. 5,671,328, U.S. Pat. No. 5,133,111, U.S. Pat. No. 5,222,146, U.S. Pat. No. 5,664,061, U.S. Pat. No. 5,553,121 and U.S. Pat. No. 5,157,384. The speech input to the system could be actual spoken commands, which the system will recognize, and/or speech terminology, which the user addresses to the computer so that the computer may propose appropriate relevant commands through feedback. The input speech goes through a recognition process which seeks a comparison to a stored set of commands 52. If an actual spoken command is clearly identified, spoken command 55, that command may be carried out and then displayed via display adapter 36 to display 38, or the spoken command may be displayed first and subsequently carried out. In this regard, the system is capable of several options as will be subsequently described in greater detail.

Where the speech input contains terminology other than actual commands, the assumption is that they are part of a speech query and the system provides for a relevance table 53 which is usually a comprehensive set of terms which may be used in any connection to each of the actual stored commands 52. If any of the input speech terms compare 54 with one of the actual commands, that actual command is characterized as a relevant command 56 which is then also presented to the user on display 38 via display adapter 36. The creation of the relevance table is described in detail in the above-mentioned copending application, which is hereby incorporated by reference. Initially, an active vocabulary is determined. This includes collecting from a computer operation—including the operating system and all significant application programs—all words and terms from menus, buttons and other user interface controls, including the invisible but active words from currently active application windows, all names of macros supplied by the speech system, the application and the user, names of other applications that the user may switch to, generic commands that are generic to any application and any other words and terms which may be currently active. This basic active vocabulary is constructed into a relevance table wherein each word or term will be related to one or more of the actual commands and, conversely, each of the actual commands will have associated with it a set of words and terms which are relevant to the command. It should be noted that this relevance table is dynamic in that it may be added to as appropriate for each particular computer operation.

Now with respect to FIGS. 3 through 7, we will provide an illustrative example of how the present invention may be used to provide for simultaneous and modeless interaction using spoken commands and/or spoken speech queries. When the screen image panels are described, it will be understood that these may be rendered by storing image and text creation programs, such as those in any conventional window operating system in the RAM 14 of the system of FIG. 1. The display screens of FIGS. 3 through 7 are presented to the viewer on display monitor 38 of FIG. 1. In accordance with conventional techniques, the user may control the screen interactively through a conventional I/O device, such as mouse 26, FIG. 1, and speech input is applied through microphone 27. These operate through user interface 22 to call upon programs in RAM 14 cooperating with the operating system 41 to create the images in frame buffer 39 of display adapter 36 to control the display panels on monitor 38.

Figure 3:
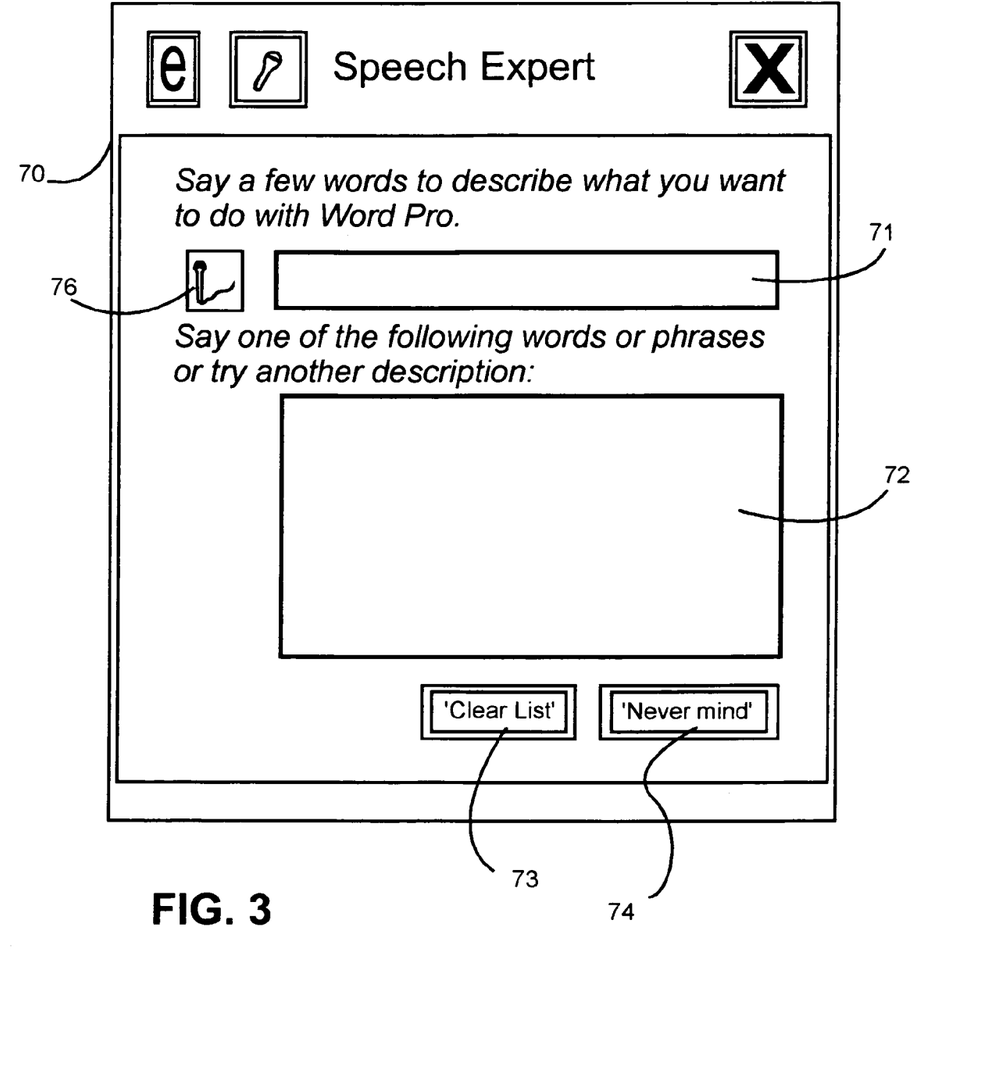
FIG. 3 is a diagrammatic view of a display screen on which an interactive dialog panel interface is used for visual feedback when a speech command and/or speech query input has been made.
Figure 4:
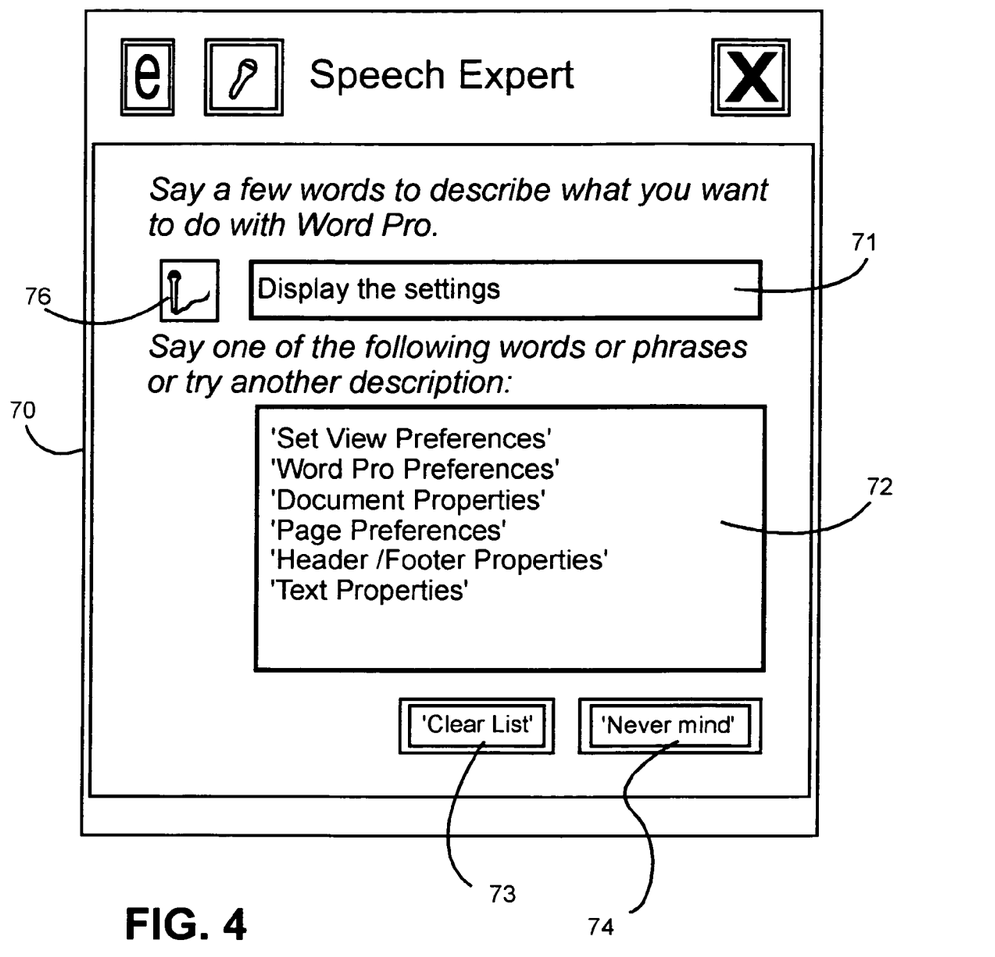
FIG. 4 is the display screen view of FIG. 3 after a speech query input has been made.
Figure 5:
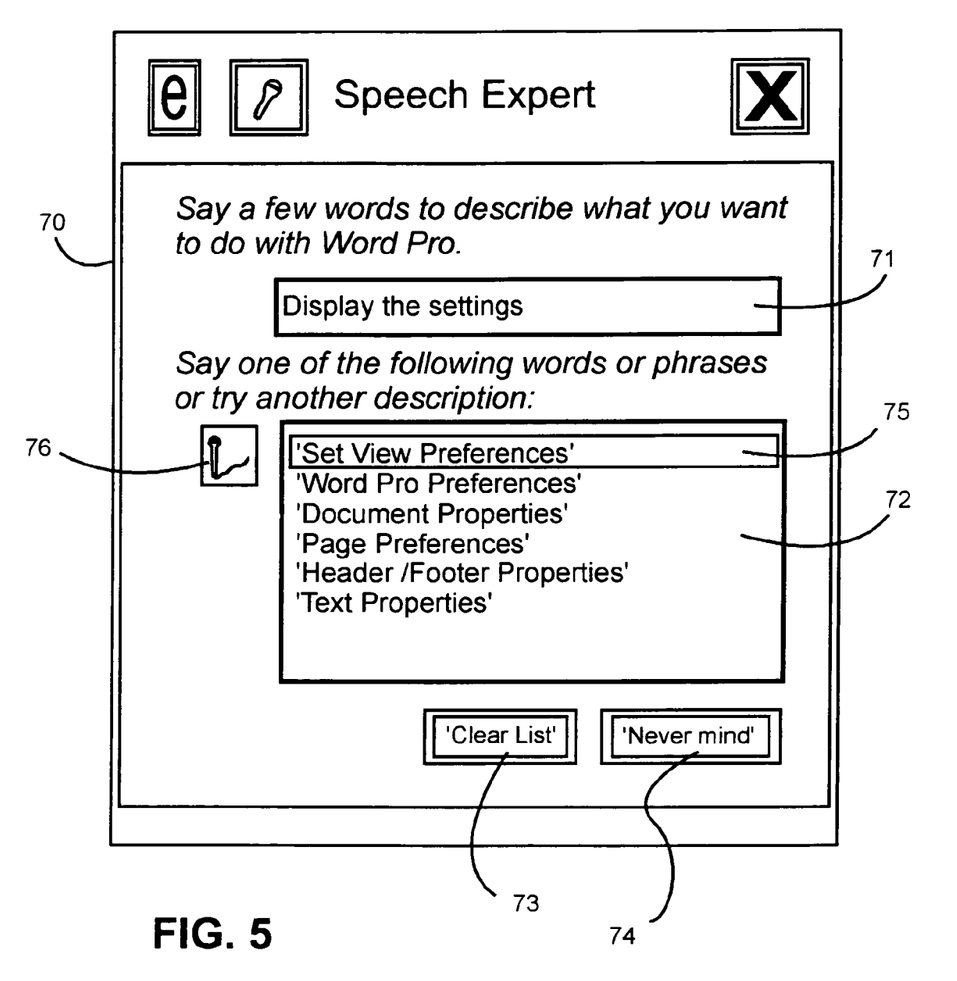
FIG. 5 is the display screen view of FIG. 4 after one of the displayed commands has been selected by speaking it.

The initial display screen of FIG. 3 shows a display screen with visual feedback display panel 70. In the panel, window 71 will show the words that the user speaks, i.e. the speech query, while window 72 will display all of the relevant commands, i.e. commands which were not actually spoken, but some of the spoken words or phrases in the window 71 were associated with the relevant commands through the relevance table as shown in FIG. 2. The panel also has command buttons: by pressing button 73 or saying the command "Clear List" the user will clear both window 71 and window 72 in FIG. 3 of all proposed relevant commands and input text. Pressing button 74 or saying the command "Never mind" causes the whole application to go away. FIG. 4 shows the screen panel 70 of FIG. 3 after the spoken query "Display the Settings". The system could find no actual command having the query terminology and, thus, recognized that this was a query. Consequently, the query was displayed in window 71. Then, using the relevance table of FIG. 2, the process was able to find the six relevant commands shown in window 72. Cursor icon 76 is adjacent the spoken term in window 71 as an indication that this query field is the speech focus. While only relevant commands have been shown in window 72, it should be noted that in operational variations, actual commands spoken by the user could also be displayed in window 72. For example, the system could be set to operate so that if a spoken command is clearly recognized as a user intended command, i.e. it is spoken alone and not in a query context, it is immediately carried out by the system. On the other hand, if the spoken actual command is not distinctly recognized but is clearly within a query context, it could be put into window 72 together with the relevant commands to give the user the opportunity to confirm that he intended to give the command by repeating the command in accordance with the procedure to be described with respect to FIG. 5. In FIG. 5, we have the display of FIG. 4 after the speech focus, as indicated by cursor icon 76, has been moved to window 73 and the user has chosen one of the relevant commands: "Set View Preferences" 75 by speaking the command; as a result, the command is highlighted. Upon the relevant command being spoken, the system will recognize it as a complete command and carry it out. Thus, we have a simple illustration of how the system concurrently distinguishes between speech commands and speech queries and seamlessly carries each process without the user having to switch back and forth between spoken command execution modes and spoken query modes.

Figure 6:
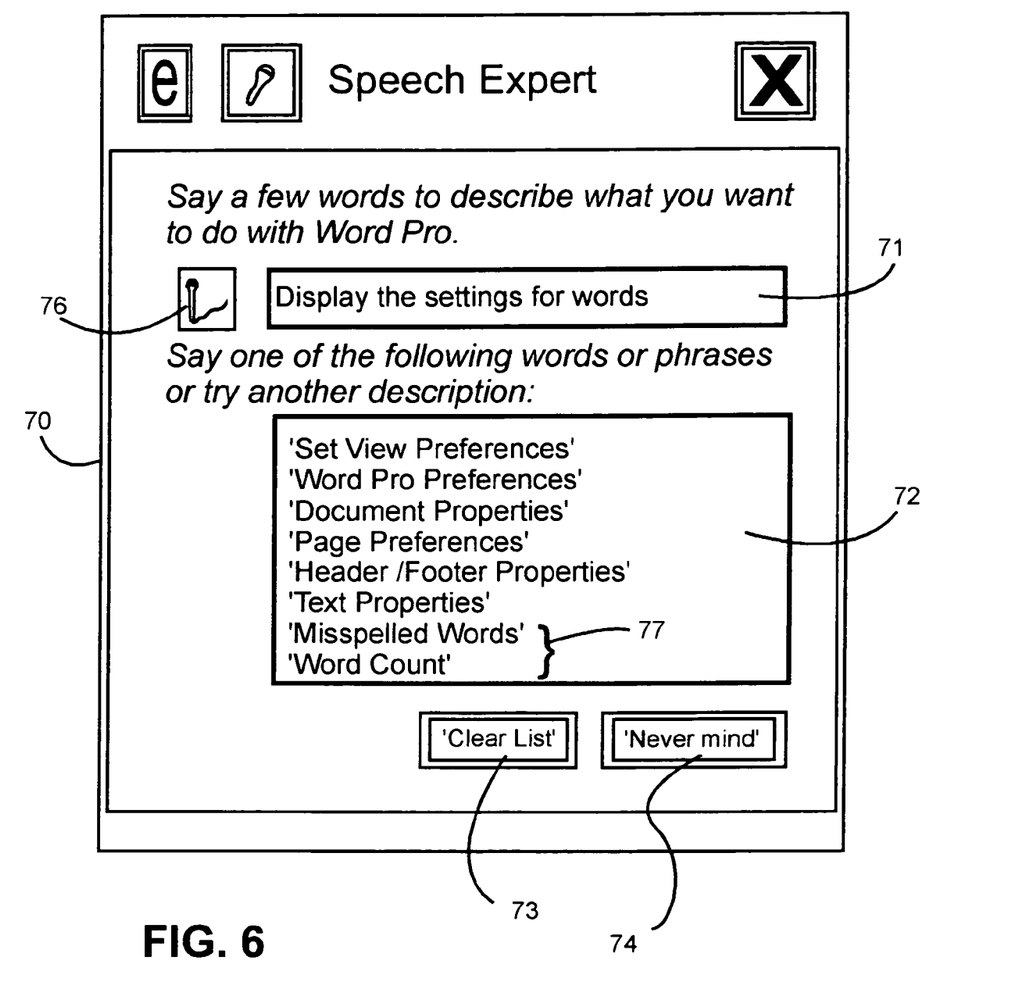
FIG. 6 is the display screen view of FIG. 4 after additional terms have been added to the speech query by speaking such additional terms.

Some further examples of seamless transitions between command execution modes and search query execution modes will be described with respect to FIGS. 6 and 7. In the process of FIG. 6, the user has spoken the term: "For Words". The term has not been recognized as a command. Thus, it is treated as a spoken query. Since the prior query has not been cleared from window 71, it is assumed to still be an active query, and the term, "For Words", is just added to it in window 71. Also, the search query into the relevance table has been expanded to include the term. As a result, two more relevant commands 77, "Misspelled Words" and "Word Count", have been added to the list of such terms in window 72.

Figure 7:
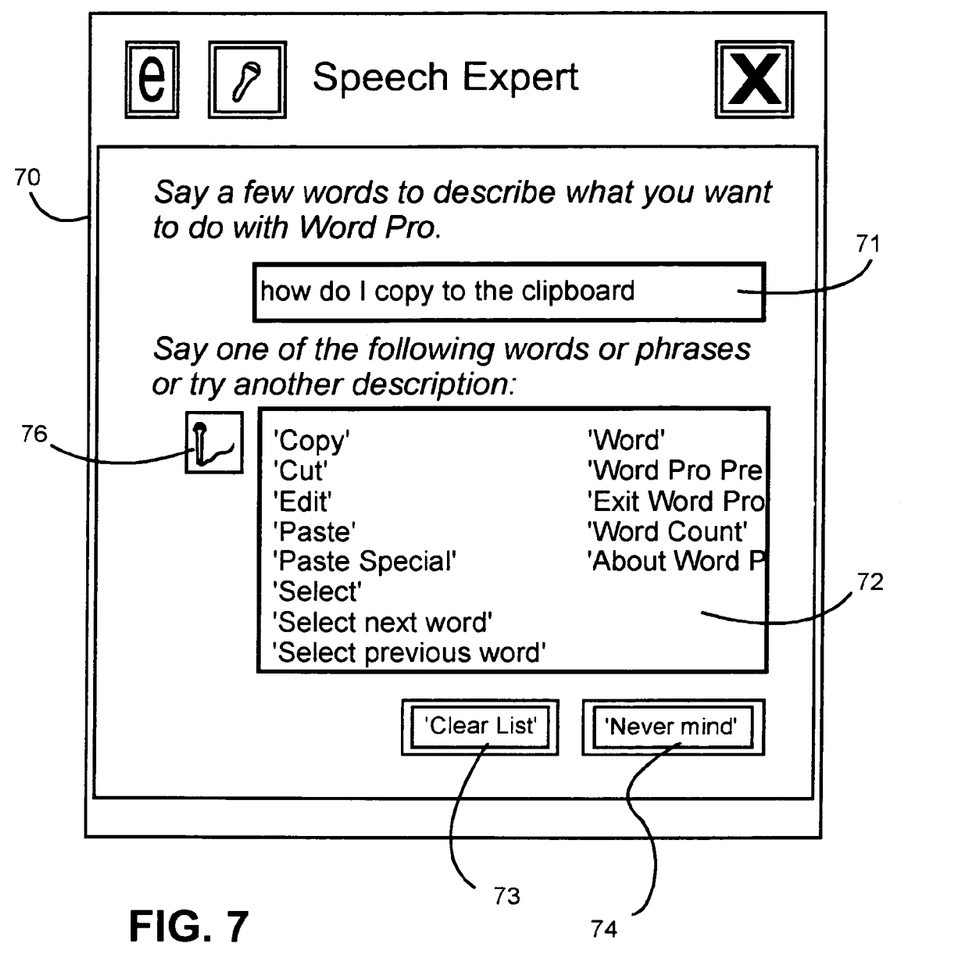
FIG. 7 is the display screen view of FIG. 4 after it has been cleared by a spoken command to clear and a new query has been spoken.

With respect to the display panel in FIG. 7, the user has spoken the command "Clear List" which cleared both windows 71 and 72 of FIG. 6. He then has spoken the term: "How do I copy to the clipboard" which the system did not find to be a command, and, thus, treated the term as a query and put it in window 71. It also searched the query which resulted in the list of twelve relevant commands displayed in window 72. The user may then select appropriate commands from this list.

Figure 8:
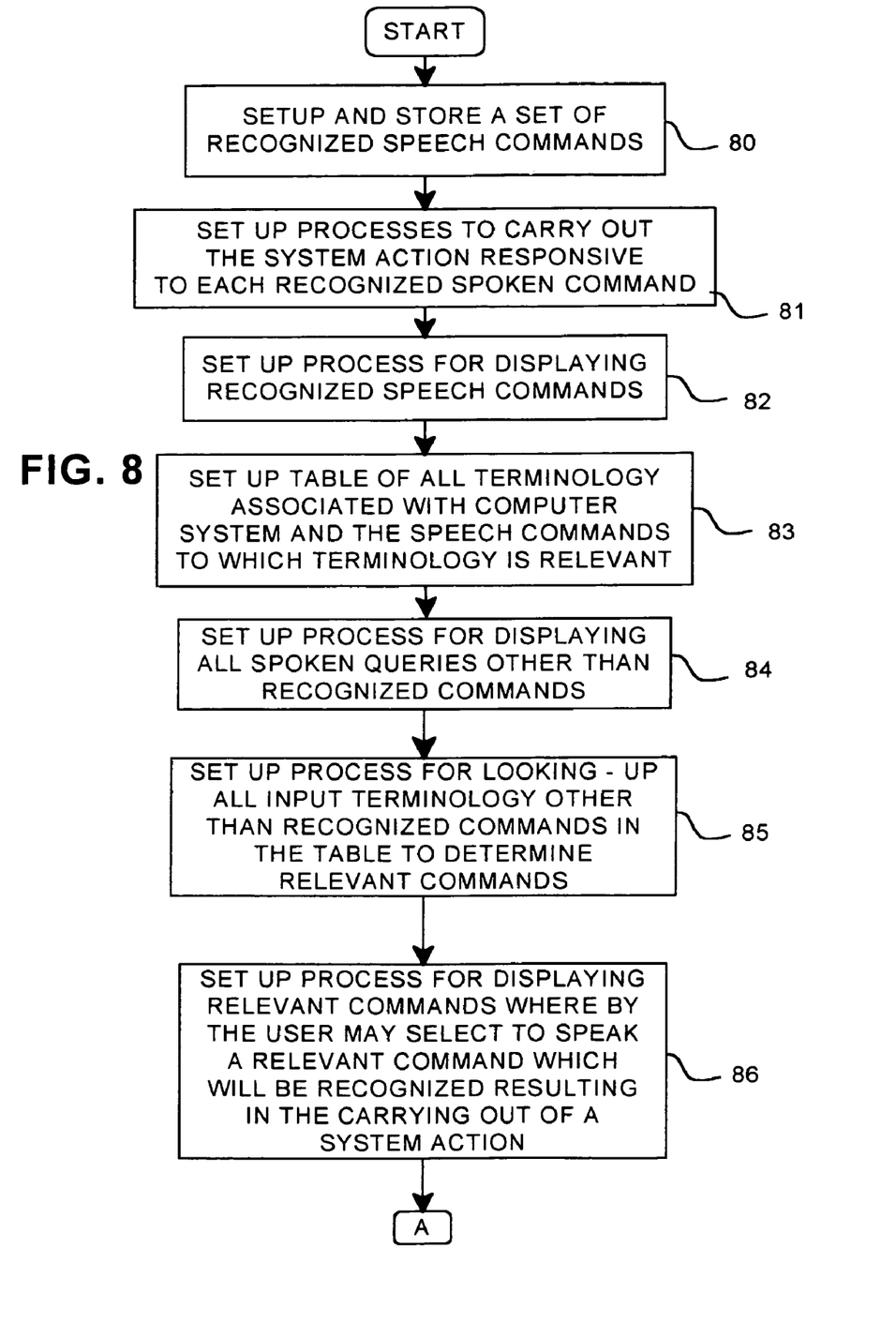
FIGS. 8 and 9 combine into a flowchart of the basic elements of the system and program in a computer controlled display system for creating and using the concurrent speech command and speech query recognition with a modeless transitions system of the present invention.
Figure 9:
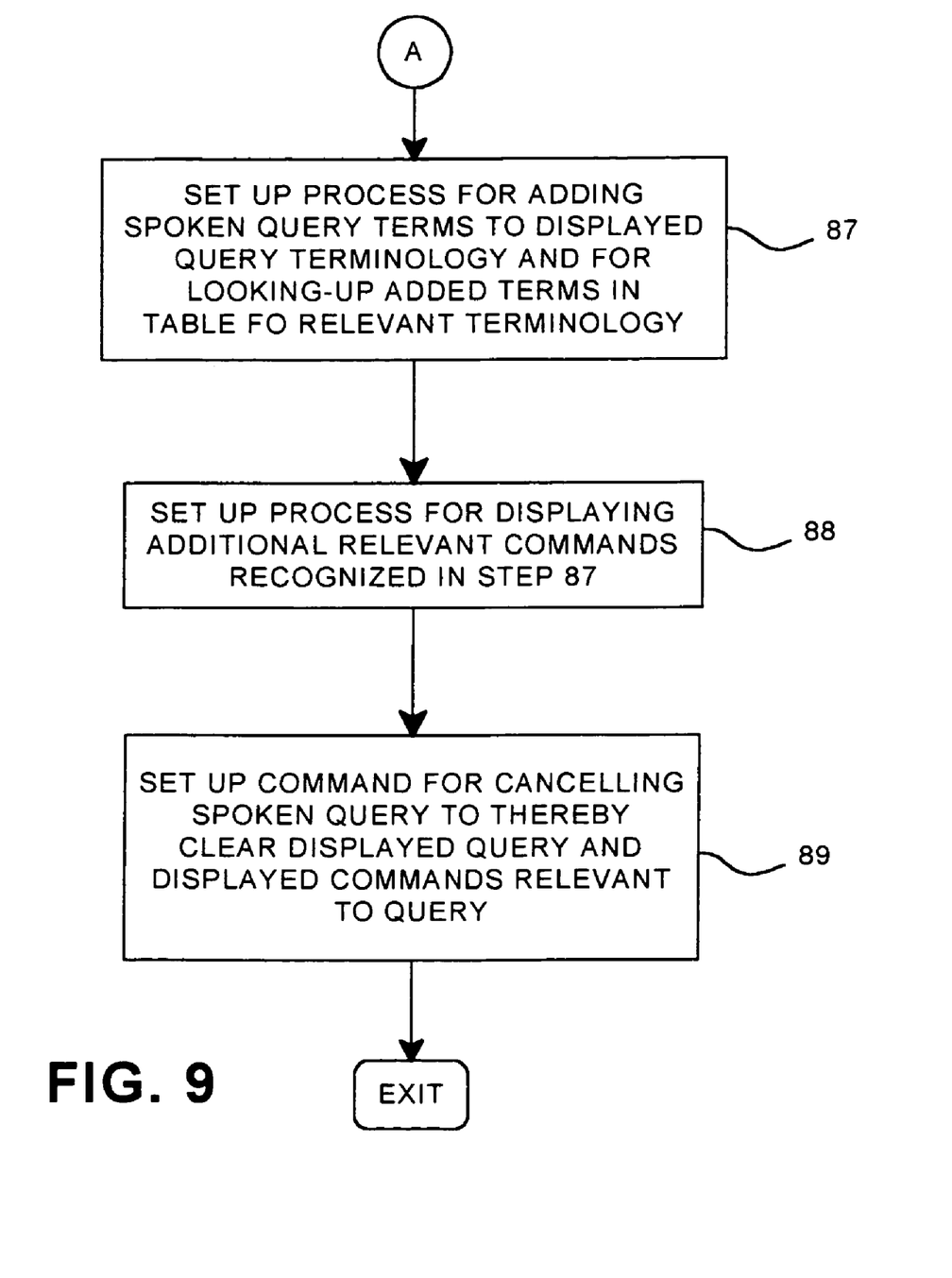
Figure 10:
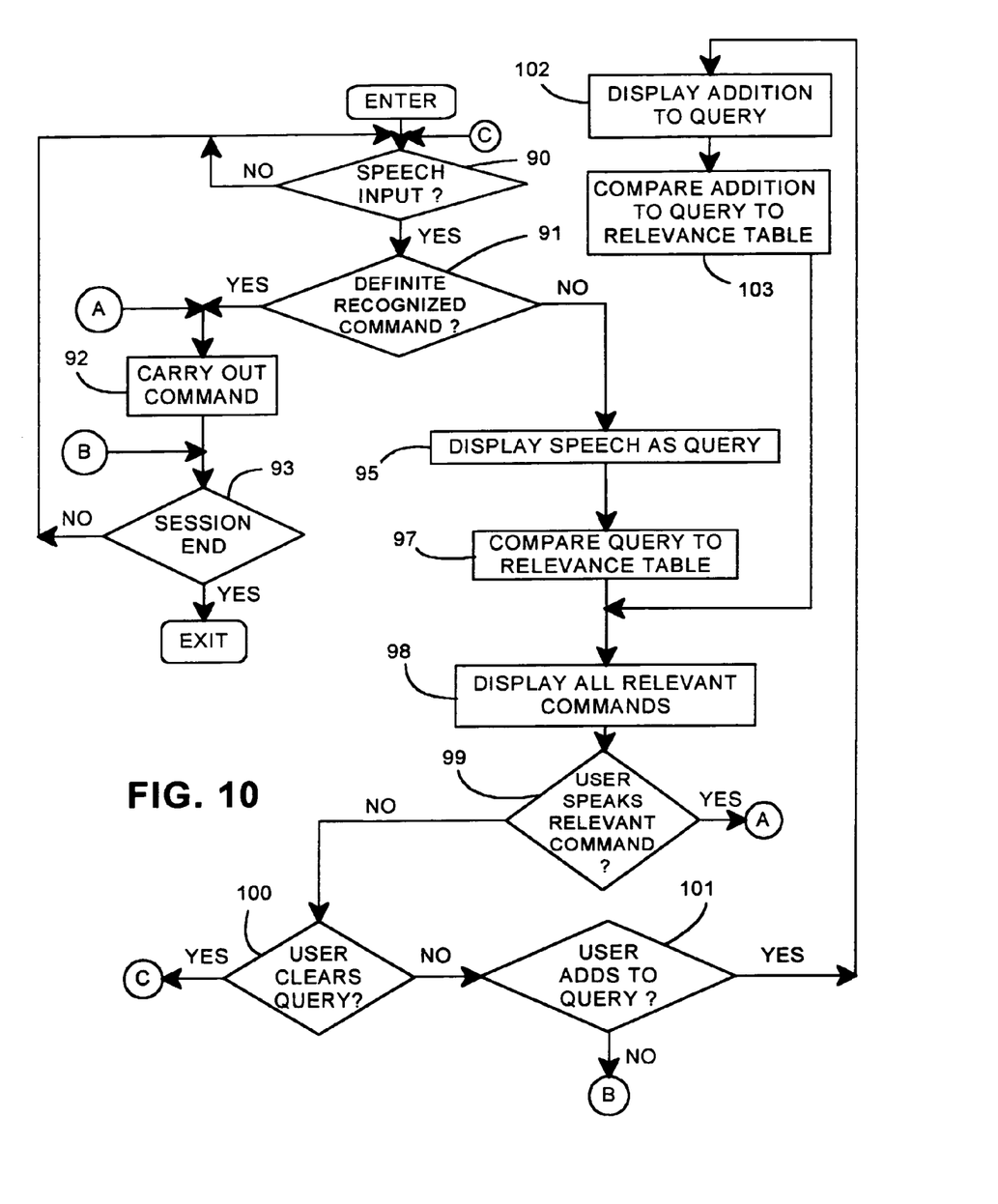
FIG. 10 is a flowchart of the steps involved in a typical run of the program set up in FIGS. 8 and 9.

Now with reference to FIGS. 8, 9 and 10, we will describe a process implemented by the present invention in conjunction with the flowcharts of these figures. FIGS. 8 and 9 combine into a flowchart showing the development of a process according to the present invention for concurrently and modelessly handling input speech commands and/or speech queries. First, step 80, a set of recognizable spoken commands, which will drive the system being used, is set up and stored. Then, there are set up appropriate processes to carry out the action called for by each recognized speech command, step 81. A process for displaying recognized speech commands is also set up. In doing so, the program developer has the option, among others, of displaying all recognized commands, or only recognized commands which are not clearly recognized as discrete user intended commands. Then the user will have the opportunity to confirm the command. As indicated in the illustration above with respect to FIGS. 3 through 7, only those commands spoken in a context not clearly user intended commands are presented to the user for confirmation, along with the relevant commands. Then, step 83, there is set up a relevance table or table of relevant commands, as previously described, particularly with respect to copending application, "SPEECH COMMAND INPUT RECOGNITION SYSTEM FOR INTERACTIVE COMPUTER DISPLAY WITH INTERPRETATION OF ANCILLARY RELEVANT SPEECH QUERY TERMS INTO COMMANDS", Scott A. Morgan et al. This table hopefully includes substantially all descriptive phrases and terminology associated with the computer system and the actual commands to which each term is relevant. A process for displaying all spoken inputs other than recognized commands, i.e. speech queries, is then set up, step 84. A process for looking up all spoken inputs other than recognized commands on this relevance table to then determine relevant commands is set up, step 85. This involves combining the system and application commands with the relevance table to generate the vocabulary of speech terms which will be used by the speech recognition system to provide the list of relevant commands. This has been previously described with respect to FIG. 2. Then there is set up a process for displaying relevant commands so that the user may choose a relevant command by speaking to set off the command action, step 86. This has been previously described with respect to FIG. 5. At this point, the set up process continues on FIG. 9 via branch "A". A process is then set up for adding recognized noncommand terms, i.e. query terms to the already displayed prior query terms and for looking-up such relevant terms in the table of relevant terms, step 87, and for displaying any additional relevant commands which result, step 88. This has been described with respect to FIG. 6. A process is set up for a recognized spoken cancel or clear command which cancels the prior spoken query along with any relevant displayed commands, step 89, whereby the user may speak an entirely new query. This has been previously described with respect to FIG. 7.

The running of the process will now be described with respect to FIG. 10. First, step 90, a determination is made as to whether there has been a speech input. If No, then the input is returned to step 90 where a spoken input is awaited. If the decision from step 90 is Yes, then a further determination is made in decision step 91 as to whether an actual command has been definitely recognized. At this point we should again distinguish, as we have above, between spoken commands which the user apparently does not intend to be carried out as commands, i.e. they are just part of the input terminology or spoken query seeking relevant commands, and commands which in view of their presentation context are intended as definite commands. If a term in the context of a spoken query happens to match one of the commands, it is just listed with the relevant commands displayed as subsequently described with respect to step 98. On the other hand, if a definite command is recognized, then the decision at step 91 would be Yes, and the command is carried out in the conventional manner, step 92, and then a determination is made as to whether the session is at an end, step 93. If Yes, the session is exited. If No, the flow is returned to step 90 where a further spoken input is awaited. If the decision from step 91 was No, that a definite command was not recognized, then, the speech is displayed as a speech query, step 95. Then a comparison is made on the relevance table as previously described, step 97, and all relevant commands are displayed, step 98, to give the user the opportunity to select one of the relevant commands. At decision step 99, a determination is made as to whether the user has spoken one of the relevant commands. If Yes, then the process is returned to step 92 via branch "A" and the command is carried out. If the decision from step 99 is No, then, decision step 100, a determination is made as to whether the user has given a command to clear the last speech query. If Yes, the process is returned to initial decision step 90 through branch "C". If the answer is No from step 100, a further determination is made, step 101, as to whether the user has spoken any terms to be added to the last query. If No, the process is returned to decision step 93 via branch "B" and a determination is made as to whether the session is at an end as previously described. If the decision from step 101 is Yes, then step 102, the addition to the query is displayed and added to the original displayed query as described in connection with FIG. 7 and the query addition is compared to the relevance table, step 103, and the additional relevant commands displayed, back to step 98 from which point the process proceeds as previously described.

In this specification, the terms, relevant commands and actual commands may have been used in various descriptions. Both refer to real commands, i.e. commands which the particular system may execute. The distinction is based on whether the command is actually spoken. Thus, an actual command would be one which the user actually speaks, whether it be as part of the spoken entry or query which the user has uttered for the purpose of locating relevant commands or the actual command is one which the user intends to be executed in the conventional manner. On the other hand, a relevant command would be a command which was not spoken by the user but was associated with a word or term in the user's spoken entry through the relevance table.

One of the preferred implementations of the present invention is as an application program 40 made up of programming steps or instructions resident in RAM 14, FIG. 1, during computer operations. Until required by the computer system, the program instructions may be stored in another readable medium, e.g. in disk drive 20, or in a removable memory such as an optical disk for use in a CD ROM computer input, or in a floppy disk for use in a floppy disk drive computer input. Further, the program instructions may be stored in the memory of another computer prior to use in the system of the present invention and transmitted over a LAN or a WAN, such as the Internet, when required by the user of the present invention. One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

The invention claimed is:

1. An interactive computer controlled display system with speech command input recognition comprising:
   means for predetermining a plurality of speech commands each associated with a corresponding plurality of system actions,
   means for concurrently detecting said predetermined speech commands and non-predetermined speech queries for locating commands,
   means responsive to a predetermined detected speech command for carrying out the system action corresponding to the command, and
   means responsive to a detected non-predetermined speech query for attempting to locate predetermined commands applicable to said query.

2. The system of claim 1 further including means for displaying said detected speech query.

3. The system of claim 2 further including means for displaying located commands applicable to said query.

4. The system of claim 3 further including means responsive to a detected speech query for modifying a displayed prior speech query whereby a user may speak a displayed located command to activate said means for carrying out a system action or speak a query to modify said prior query to locate commands other than said displayed commands without switching between command and query modes of speech detection.

5. The system of claim 4 wherein said means for modifying said prior speech query replaces said prior query with a new speech query.

6. A method for providing speech command input to an interactive computer controlled display system with speech command input recognition comprising:
   predetermining a plurality of speech commands each associated with a corresponding plurality of system actions,
   concurrently detecting said predetermined speech commands and non-predetermined speech queries for locating commands,
   responsive to a detected predetermined speech command, carrying out the system action corresponding to the command, and
   responsive to a detected non-predetermined speech query, attempting to locate predetermined commands applicable to said query.

7. The method of claim 6 further including the step of displaying said detected speech query.

8. The method of claim 7 further including the step of displaying located commands applicable to said query.

9. The method of claim 8 further including the step responsive to a detected speech query of modifying a displayed prior speech query whereby a user may speak a displayed located command to activate said carrying out of a system action or speak a query to modify said prior query to locate commands other than said displayed commands without switching between command and query modes of speech detection.

10. The method of claim 9 wherein said step of modifying said prior speech query replaces said prior query with a new speech query.

11. A computer program having program code included on a computer readable medium for speech command input recognition in an interactive computer controlled display system comprising:
    means for predetermining a plurality of speech commands each associated with a corresponding plurality of system actions,
    means for concurrently detecting said predetermined speech commands and non-predetermined speech queries for locating commands,
    means responsive to a detected predetermined speech command for carrying out the system action corresponding to the command, and
    means responsive to a detected non-predetermined speech query for attempting to locate predetermined commands applicable to said query.

12. The computer program of claim 11 further including means for displaying said detected speech query.

13. The computer program of claim 12 further including means for displaying located commands applicable to said query.

14. The computer program of claim 13 further including means responsive to a detected speech query for modifying a displayed prior speech query whereby a user may speak a displayed located command to activate said means for carrying out a system action or speak a query to modify said prior query to locate commands other than said displayed commands without switching between command and query modes of speech detection.

15. The computer program of claim 14 wherein said means for modifying said prior speech query replaces said prior query with a new speech query.

* * * * *